United States Patent
Huang

(10) Patent No.: US 10,716,104 B2
(45) Date of Patent: Jul. 14, 2020

(54) METHOD FOR CONTROLLING C-RAN

(71) Applicant: INDUSTRIAL TECHNOLOGY RESEARCH INSTITUTE, Hsinchu (TW)

(72) Inventor: Jen-Feng Huang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 119 days.

(21) Appl. No.: 15/854,958

(22) Filed: Dec. 27, 2017

(65) Prior Publication Data

US 2019/0174464 A1 Jun. 6, 2019

(30) Foreign Application Priority Data

Dec. 5, 2017 (TW) .............................. 106142612 A

(51) Int. Cl.
*H04W 72/04* (2009.01)
*H04W 88/08* (2009.01)
*H04W 74/00* (2009.01)
*H04W 72/14* (2009.01)

(52) U.S. Cl.
CPC ....... *H04W 72/042* (2013.01); *H04W 72/048* (2013.01); *H04W 72/0486* (2013.01); *H04W 88/085* (2013.01); *H04W 72/14* (2013.01); *H04W 74/004* (2013.01); *H04W 74/008* (2013.01)

(58) Field of Classification Search
None
See application file for complete search history.

(56) References Cited

U.S. PATENT DOCUMENTS

| 8,433,319 B2 | 4/2013 | Ren et al. |
| 9,173,158 B2 | 10/2015 | Varma |
| 9,526,049 B2 | 12/2016 | Yuk et al. |

(Continued)

FOREIGN PATENT DOCUMENTS

| CN | 105959980 A | 9/2016 |
| EP | 3079407 A1 | 10/2016 |

(Continued)

OTHER PUBLICATIONS

EP Office Action in Application No. 17 210 370.7 dated Mar. 25, 2020.

(Continued)

*Primary Examiner* — Christopher T Wyllie
(74) *Attorney, Agent, or Firm* — Maschoff Brennan

(57) ABSTRACT

A method for controlling C-RAN applicable for a C-RAN having a plurality of remote radio heads (RRH) and a baseband unit (BBU) includes the following steps: collecting a first uplink signal corresponding to a first user end device, determining a first estimated region based on a communication range of part of RRH's receiving the first uplink signal, setting N estimated coordinates in the first estimated region wherein N is larger than one, giving N moving directions to the N estimated coordinates, modifying the N estimated coordinates based on a maximum displacement and the N moving directions, and selecting at least one RRH to send a type-3 downlink packet to the first user end device based on the N modified estimated coordinates.

9 Claims, 11 Drawing Sheets

(56) References Cited

U.S. PATENT DOCUMENTS

| | | | |
|---|---|---|---|
| 2004/0179475 A1* | 9/2004 | Hwang | H04L 47/10 370/229 |
| 2004/0218622 A1* | 11/2004 | Kumaran | H04Q 11/0062 370/458 |
| 2006/0047849 A1* | 3/2006 | Mukherjee | G06F 15/17375 709/238 |
| 2007/0259624 A1* | 11/2007 | Alizadeh-Shabdiz | G01S 11/02 455/67.11 |
| 2008/0279219 A1* | 11/2008 | Wu | H04L 45/00 370/474 |
| 2009/0034507 A1* | 2/2009 | Chang | H04W 12/0013 370/349 |
| 2010/0260136 A1 | 10/2010 | Fan et al. | |
| 2012/0224541 A1* | 9/2012 | Yoshiuchi | H04W 16/10 370/329 |
| 2013/0010800 A1* | 1/2013 | Ilan | H04L 1/0084 370/400 |
| 2013/0094447 A1* | 4/2013 | Gidlund | H04W 88/16 370/328 |
| 2013/0137436 A1 | 5/2013 | Lee et al. | |
| 2014/0003268 A1 | 1/2014 | Zarifi et al. | |
| 2014/0071912 A1* | 3/2014 | Hou | H04L 5/0035 370/329 |
| 2014/0105056 A1* | 4/2014 | Li | H04W 24/02 370/252 |
| 2014/0341163 A1* | 11/2014 | Zhang | H04B 7/024 370/329 |
| 2015/0016382 A1* | 1/2015 | Yuk | H04W 60/04 370/329 |
| 2015/0036664 A1 | 2/2015 | Yuk et al. | |
| 2015/0063373 A1* | 3/2015 | Savaglio | H04W 88/08 370/466 |
| 2015/0063481 A1* | 3/2015 | Von Wrycza | H04B 7/024 375/267 |
| 2015/0296344 A1* | 10/2015 | Trojer | H04W 4/027 455/456.1 |
| 2015/0358890 A1* | 12/2015 | Xu | H04W 48/16 455/437 |
| 2015/0358988 A1 | 12/2015 | Yuang et al. | |
| 2016/0135007 A1* | 5/2016 | Persson | H04W 4/023 455/456.2 |
| 2016/0192347 A1* | 6/2016 | Kobayashi | H04W 72/048 370/329 |
| 2016/0262179 A1* | 9/2016 | Choi | H04B 7/0608 |
| 2017/0079059 A1 | 3/2017 | Li et al. | |
| 2017/0105161 A1* | 4/2017 | Axmon | H04W 36/165 |
| 2017/0150497 A1 | 5/2017 | Boldi et al. | |
| 2017/0164336 A1* | 6/2017 | Boldi | H04W 72/0433 |
| 2017/0223506 A1* | 8/2017 | Kim | H04W 64/00 |
| 2017/0318605 A1* | 11/2017 | Wijetunge | H04W 16/32 |
| 2017/0367097 A1* | 12/2017 | Sohn | H04W 36/305 |
| 2017/0374673 A1* | 12/2017 | Hasegawa | H04W 72/10 |
| 2018/0070264 A1* | 3/2018 | Saiwai | H04W 28/0278 |
| 2018/0167883 A1* | 6/2018 | Guo | H04W 52/0216 |
| 2018/0206144 A1* | 7/2018 | Jiang | H04W 4/023 |
| 2018/0324552 A1* | 11/2018 | Kumar | H04W 4/029 |
| 2018/0343646 A1* | 11/2018 | Chou | H04W 16/28 |
| 2019/0029073 A1* | 1/2019 | Yiu | H04B 7/0617 |
| 2019/0261193 A1* | 8/2019 | Torsner | H04B 7/0695 |
| 2019/0335348 A1* | 10/2019 | Hou | H04W 24/08 |

FOREIGN PATENT DOCUMENTS

| | | |
|---|---|---|
| TW | 201547310 A | 12/2015 |
| WO | 2010/076300 A1 | 7/2010 |
| WO | 2013/125919 A1 | 8/2013 |
| WO | 2016039839 A1 | 3/2016 |

OTHER PUBLICATIONS

TW Office Action in application No. 106142612 dated Sep. 12, 2018.

Ericsson, "Random access for NB-IOT", WG2 Meeting NB-IOT ad-hoc,Budapest, Hungary, Jan. 19, 2016.

Qualcomm Incorporated, "2 step and 4 step RACH", WG1 #87, Nov. 14, 2016.

EP Office Action dated Apr. 10, 2018 in application No. 17210370.7.

Checko, Aleksandra, et al. "Evaluating C-RAN fronthaul functional splits in terms of network level energy and cost savings." Journal of Communications and Networks 18.2 (Apr. 2016): 162-172.

Ramalho, Leonardo, et al. "An LPC-Based Fronthaul Compression Scheme." IEEE Communications Letters 21.2 (Feb. 2017): 318-321.

Park, Seok-Hwan, et al. "Inter-cluster design of precoding and fronthaul compression for cloud radio access networks." IEEE Wireless Communications Letters 3.4 (Aug. 2014): 369-372.

Qin, Cheng, et al. "Fronthaul Load Balancing in Energy Harvesting Powered Cloud Radio Access Networks." IEEE Access (Apr. 24, 2017).

Park, Seok-Hwan, et al. "Fronthaul compression for cloud radio access networks: Signal processing advances inspired by network information theory." IEEE Signal Processing Magazine31.6 (Nov. 2014): 69-79.

Zhou, Yuhan, et al. "On the optimal fronthaul compression and decoding strategies for uplink cloud radio access networks." IEEE Transactions on Information Theory 62.12 (Dec. 2016): 7402-7418.

Huang, Jen-Feng, Guey-Yun Chang, and Gen-Huey Chen. "A historical-beacon-aided localization algorithm for mobile sensor networks." IEEE Transactions on Mobile Computing 14.6 (Jun. 2015): 1109-1122.

Hu, Lingxuan, and David Evans. "Localization for mobile sensor networks." Proceedings of the 10th annual international conference on Mobile computing and networking. ACM, Sep. 26, 2004.

* cited by examiner

METHOD FOR CONTROLLING C-RAN

CROSS-REFERENCE TO RELATED APPLICATIONS

This non-provisional application claims priority under 35 U.S.C. § 119(a) on Patent Application No(s). 106142612 filed in Taiwan, R.O.C. on 2017 Dec. 5, the entire contents of which are hereby incorporated by reference.

TECHNICAL FIELD

The disclosure relates to a method for controlling C-RAN, and a method for controlling handover free C-RAN.

BACKGROUND

Centralized radio access network (C-RAN), also called as cloud-RAN, is a network constructed by a plurality of distributed remote radio heads (RRHs). C-RAN utilizes the virtualization technique incorporates with the wire network to centralize the baseband resource. This technique leads to a revolution on the architecture and design of the baseband unit. The connection and algorithm of the baseband unit and the radio head are therefore changing so as to efficiently share the resources to implement the loading balance and error tolerance in network. The C-RAN can simplify the back haul but increase the complexity of the connections between the baseband unit and the plurality of remote radio heads, the front haul.

Please refer to FIG. 1, which is a schematic of a C-RAN. As shown in FIG. 1, a C-RAN 1000 has a baseband unit BBU and a plurality of remote radio heads RRH01~RRH20 corresponding to the baseband unit BBU, and there is also a user end device UE moving in the region where the remote radio heads RRH01~RRH20 are located. The physical locations of the remote radio heads RRH01~RRH20 are different from one another. The baseband unit BBU is communicatively connected to the remote radio heads RRH01~RRH20. Explicitly, there is data packets sent/received between the baseband unit BBU and any one of the remote radio heads RRH01~RRH20.

In the conventional C-RAN, when the baseband unit BBU needs to send a packet to the user end device UE, the baseband unit BBU sends the packet to all of the remote radio heads RRH01~RRH20 when all RRHs are belong to the same cell, so the network traffic between the baseband unit BBU and the remote radio heads RRH01~RRH20 is occupied by a large number of packets.

SUMMARY

In one embodiment of the disclosure, a method for controlling C-RAN having a plurality of remote radio heads and a baseband unit includes the following steps: receiving a plurality of preambles from the plurality of remote radio heads and each preamble corresponding to a user end device, determining at least one type-2 downlink packet based on the plurality of preambles and the plurality of remote radio heads, determining whether a number of resource blocks of PDCCH is enough or not based on an amount of control signals of the type-2 downlink packets if there are more than one type-2 downlink packets, and integrating at least part of the type-2 downlink packets based on a remote radio head arrangement table if the number of resource blocks is not enough. The remote radio head arrangement table is used for illustrating a relationship between geometric locations of the plurality of remote radio heads.

In one embodiment, a method for controlling C-RAN applicable for a C-RAN having a plurality of remote radio heads (RRHs) and a baseband unit (BBU) includes the following steps: collecting a first uplink signal corresponding to a first user end device, determining a first estimated region based on a communication range of part of RRH's receiving the first uplink signal, setting N estimated coordinates in the first estimated region wherein N is an integer larger than one, giving N moving directions to the N estimated coordinates, modifying the N estimated coordinates based on a maximum displacement and the N moving directions, and selecting at least one RRH among the plurality of remote radio heads to send a type-3 downlink packet to the first user end device based on the N modified estimated coordinates.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
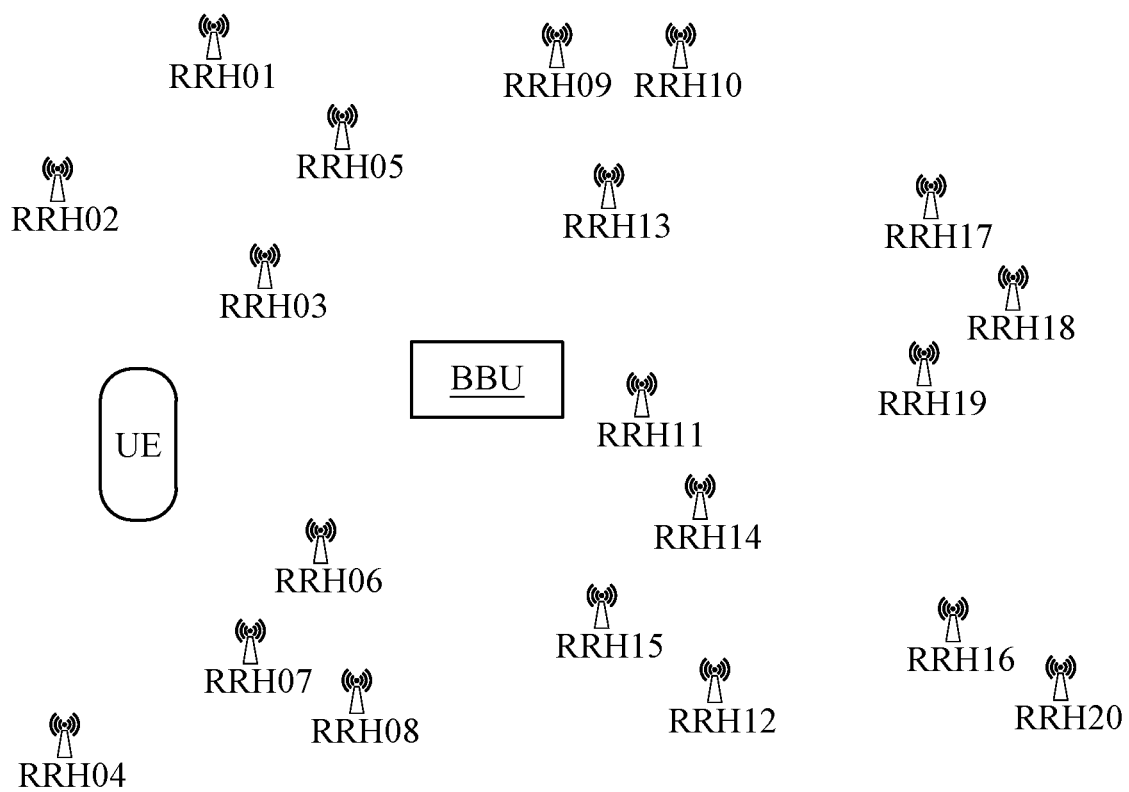
FIG. 1 is a schematic of a C-RAN.
Figure 2:
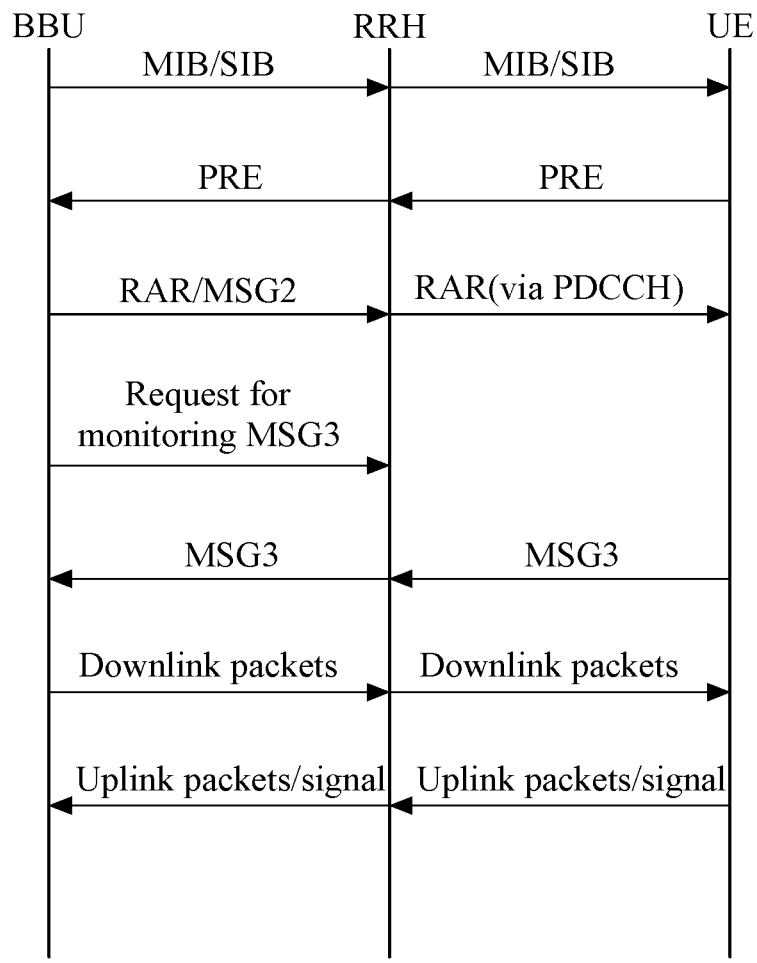
FIG. 2 illustrates an operation procedure of the C-RAN.

Please refer to FIG. 1 and FIG. 2 together, wherein FIG. 2 illustrates an operation procedure of the C-RAN when all RRH operate in the same cell. In order to allow the user end device UE to register on the baseband unit BBU so as to join the network dominated by the baseband unit BBU, all of the remote radio heads RRH01~RRH20 periodically broadcast the master information block (MIB) and the system information block (SIB), and these types of packets are defined as type-1 downlink packet in the disclosure.

Afterwards, all of the remote radio heads RRH01~RRH20 wait for receiving the preamble PRE from the user end device. The remote radio head receiving the preamble uploads the preamble to the baseband unit BBU. When the baseband unit BBU receives the preamble PRE of the user end device UE from the remote radio head, the baseband unit BBU needs to reply a second message MSG2 to the user end device UE. The second message MSG2 includes the resources assigned to the user end device UE for the user end device UE completing the register procedure. Explicitly, the baseband unit BBU determines to send the corresponding second message MSG2 to which remote radio head(s) based on which remote radio head(s) receives the preamble PRE. When the baseband unit BBU sends the second message MSG2 to the user end device UE via certain remote radio head, such as the remote radio head RRH01, the baseband unit BBU sends the second message MSG2 via the physical downlink control channel (PDCCH) and the physical downlink share channel (PDSCH) to the corresponding remote radio head, and the remote radio head then sends the message packet to the user end device UE previously sending the preamble. Such kind of packet transmission is defined as the type-2 downlink packet in the disclosure.

The PDCCH has 16 resource blocks. If two different second messages MSG2 are to be sent to the adjacent remote radio heads, the control signal of one second message MSG2 has to be located in a resource block different from the resource block where the other one second message MSG2 is located. Hence, the user end device UE is capable of decoding to obtain the response signal of its own preamble whichever the second message MSG2 it receives. The principle for sending the type-2 downlink packet is illustrated below in examples. Please refer to FIG. 1. In one example, the remote radio head RRH01 previously received the preamble PRE1, the preamble PRE2 and the preamble PRE3, and the remote radio head RRH02 previously received the preamble PRE2, and both of the remote radio head RRH03 and RRH04 previously received the preamble PRE1. Hence, the remote radio head RRH01 should send a type-2 downlink packet RAR1 including the response signal of the preamble PRE1, the response signal of the preamble PRE2 and the response signal of the preamble PRE3. The remote radio head RRH02 should send a type-2 downlink packet RAR2 including the response signal of the preamble PRE2. Both of the remote radio head RRH03 and the remote radio head RRH04 should send a type-2 downlink packet RAR3 including the response signal of the preamble PRE1.

In one embodiment, the remote radio head RRH01, the remote radio head RRH02 and the remote radio head RRH03 are adjacent to each other, i.e., their coverage are overlapping, while the remote radio head RRH04 is away from them, as shown in FIG. 1. In this embodiment, the baseband unit BBU chooses that the control signal of each type-2 downlink packet occupies four resource blocks in the PDCCH. The control signal of the type-2 downlink packet RAR1 occupies the first resource block through the fourth resource block in PDCCH, the control signal of the type-2 downlink packet RAR2 occupies the fifth resource block through the eighth resource block in PDCCH, and the control signal of the type-2 downlink packet RAR3 occupies the ninth resource block through the twelfth resource block in PDCCH. Hence, the baseband unit BBU choose to unicast the type-2 downlink packet RAR1 to the remote radio head RRH01, to unicast the type-2 downlink packet RAR2 to the remote radio head RRH02. The baseband unit BBU determines to unicast, multicast or broadcast the type-2 downlink packet RAR3 to the remote radio head RRH03 and RRH04 based on the network traffic consumption.

In one embodiment, when there are too many control signals of the type-2 downlink packet so that the resource blocks of the PDCCH is not enough, the baseband unit BBU reorganize some type-2 downlink packets if those type-2 downlink packets are sent via adjacent remote radio heads based on the remote radio head arrangement table. The remote radio head arrangement table is used for illustrating the relationship between the geometric locations of the remote radio heads. For example, the remote radio head RRH01, the remote radio head RRH02, and the remote radio head RRH03 are adjacent to one another. Hence, the packet RAR* sent from the baseband unit BBU to the remote radio head RRH01, the remote radio head RRH02 and the remote radio head RRH03 has to include the contents of all of the type-2 downlink packets RAR1~RAR3. Further, each of the remote radio head RRH01, the remote radio head RRH02, and the remote radio head RRH03 sends the packet RAR*. In this way, the bottleneck that the resource blocks of PDCCH are not enough is prevented. In this condition, the packet RAR* is sent to the remote radio head RRH01, the remote radio head RRH02 and the remote radio head RRH03 by multicast so as to reduce the traffic consumption between the baseband unit BBU and the remote radio heads as much as possible.

After the user end device UE receives the response signal from the baseband unit BBU, the first packet transmission from the user end device UE to the baseband unit BBU is performed. This packet transmission, for example, includes the RRC connection request or the connection re-establishment, and such packet transmission is defined as the third message MSG3 in LTE standard. In one embodiment, the baseband unit BBU then requests all of the remote radio heads RRH01~RRH20 to wait for receiving or monitoring the third message MSG3 (an uplink signal). In another embodiment, the baseband unit BBU only requests the remote radio heads previously receiving the preamble PRE, such as the remote radio heads RRH01~RRH04 to wait for receiving the third message MSG3.

In one embodiment, the baseband unit BBU has to call or wake up certain user end device, and such kind of packet is defined as the type-4 downlink packet in the disclosure. The type-4 downlink packet is a broadcast packet mainly used for waking up the user end device. Explicitly, the type-4 downlink packet is a packet in which one or more user end devices to be wakened up are encoded in ASN.1 for the user end device to identify. Hence, one type-4 downlink packet includes contents corresponding to one or more user end devices. When the type-4 downlink packet is transmitted, the baseband unit BBU informs the MAC layer which one or more user devices have to receive this type-4 downlink packet. Assuming that the first user end device UE1 has to be wakened up via the remote radio head RRH01 and/or the remote radio head RRH02, and the second user end device UE2 has to be wakened up via the remote radio head RRH02 and/or the remote radio head RRH03, and the third user end device UE3 has to be wakened up via the remote radio head RRH04. The remote radio head RRH01, the remote radio head RRH02 and the remote radio head RRH03 are adjacent to one another, so the baseband unit BBU encrypts a type-4 downlink packet including the contents corresponding to the user end devices UE1 and UE2 in the communication range of the remote radio head RRH01, the remote radio head RRH02 and the remote radio head RRH03. For example, the type-4 downlink packet PG1 sent to the remote radio head RRH01, the remote radio head RRH02, and the remote radio head RRH03 includes the wakening signal for the user end devices UE1 and UE2. The type-4 downlink packet PG2 sent to the remote radio head RRH04 includes the wakening signal for the user end device UE3. In another embodiment, the baseband unit BBU sends the type-4 downlink packet, the wakening packet, with the manner similar to the manner sending the type-1 downlink packet.

In one embodiment, the uplink packets other than the third message MSG3 are defined as the type-2 uplink packets and the downlink packets other than either the type-1 downlink packet, the type-2 downlink packet, or the type-4 downlink packet are defined as the type-3 downlink packets. The type-2 uplink packets and the type-3 downlink packets dominate the packet transmission and consume the most packet traffic.

Figure 3A:
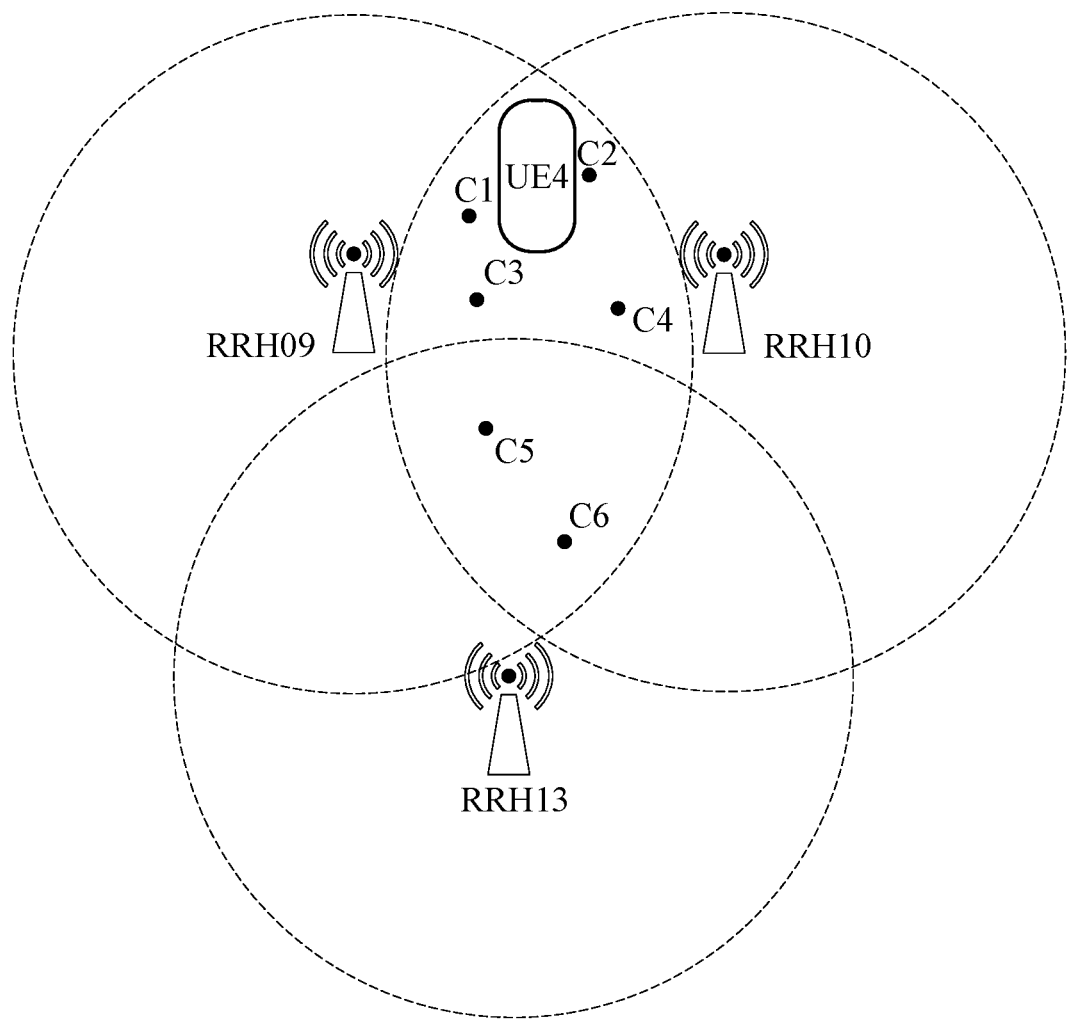
FIG. 3A to FIG. 3D illustrate the operation of the method for controlling C-RAN in one embodiment of the disclosure.
Figure 3B:
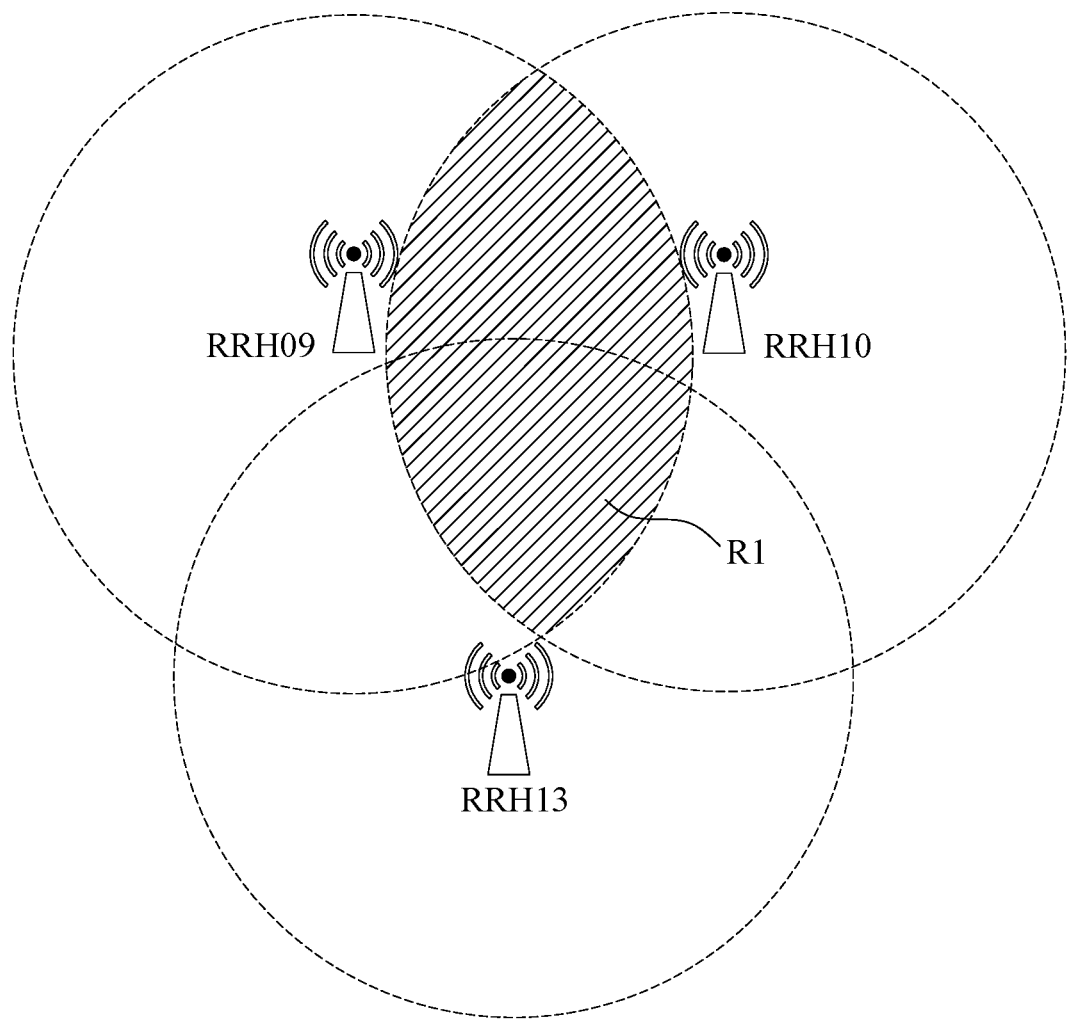
Figure 3C:
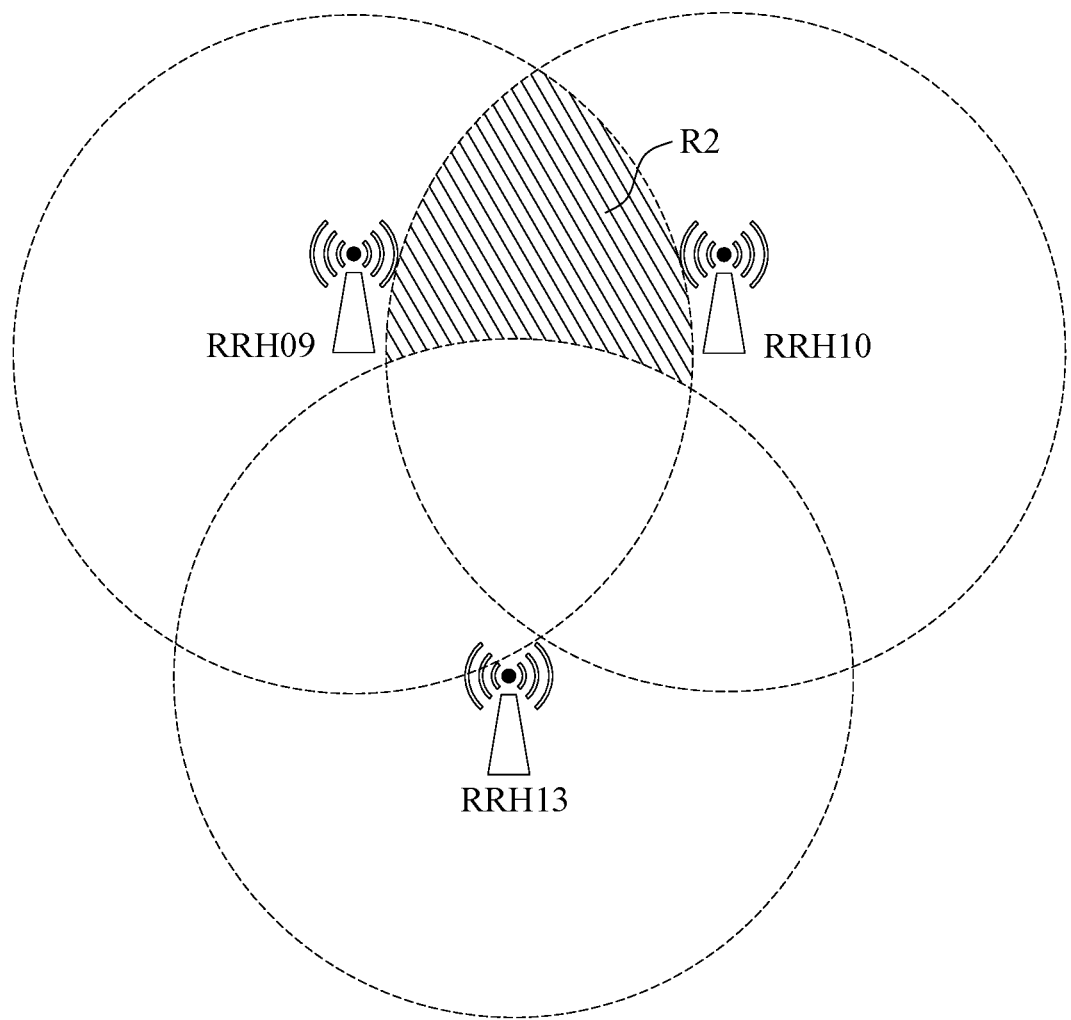
Figure 3D:
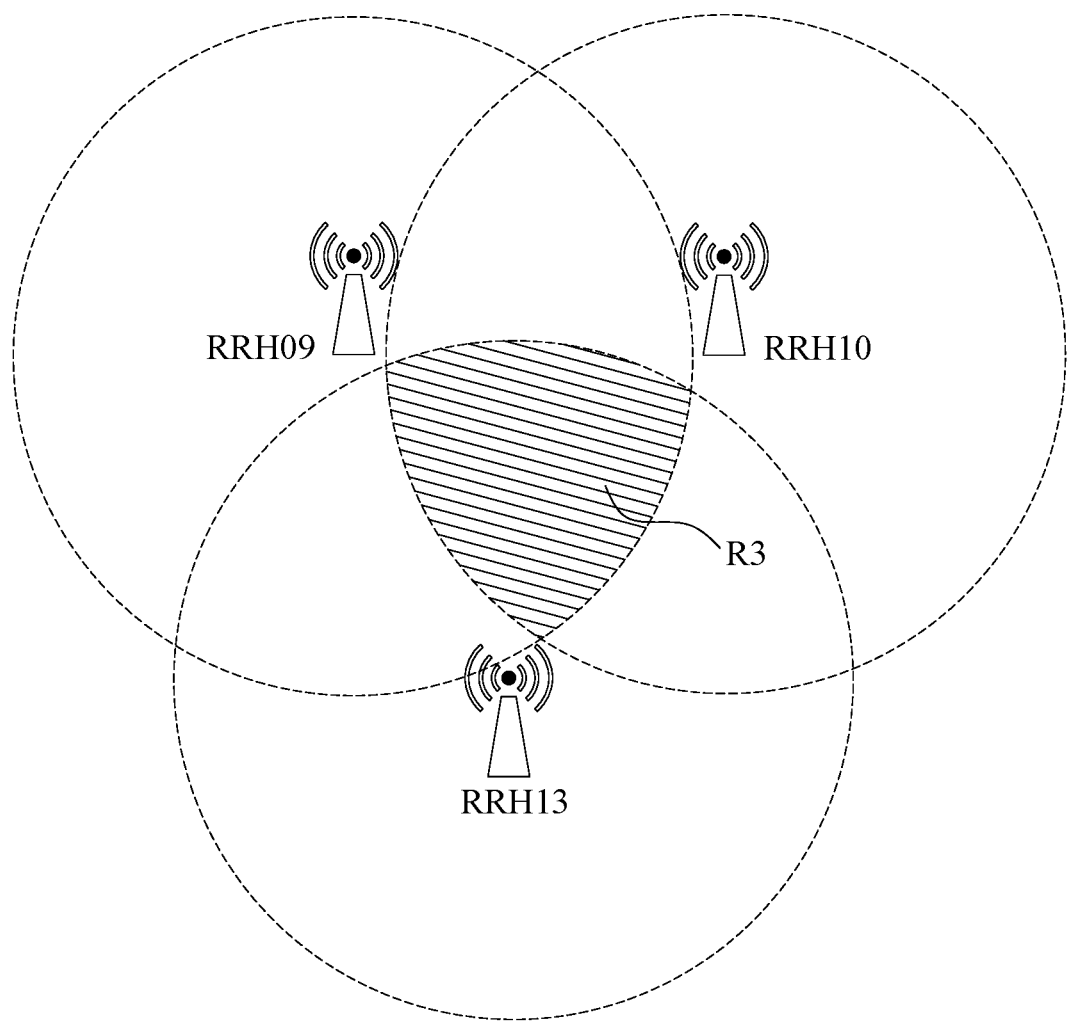

In one embodiment, the procedure begins from receiving the third message MSG3 so as to explain the operation of the baseband unit BBU sending the type-3 downlink packet and receiving the type-2 uplink packet via the remote radio heads. In the following, the uplink signals, signals/packets sent from the user end device to the remote radio head, are classified as the first uplink signal and the second uplink signal based on the timing sequence of the uplink packets. Please refer to FIG. 3A to FIG. 3D, which illustrate the operation of the method for controlling C-RAN in one embodiment of the disclosure. For example, the baseband unit BBU determines which one or more remote radio heads the third message MSG3, which is the first uplink signal, of the fourth user end device UE4 comes from. In this case, the remote radio head RRH09 and the remote radio head RRH10 receives the third message MSG3 from the fourth user end device UE4 while the remote radio head RRH13 adjacent to the aforementioned two remote radio heads does not receive the third message MSG3 from the fourth user end device UE4. Hence, the fourth user end device UE4 must be in the region covered by the intersection of the communication range of the remote radio head RRH09 and the communication range of the remote radio head RRH10, as the shading area shown in FIG. 3B. In this embodiment, the intersection of the communication range of the remote radio head RRH09 and the communication range of the remote radio head RRH10 is defined as the first estimated region R1. Further, the remote radio head RRH13 does not receive the third message MSG3 from the fourth user end device UE4, so the baseband unit BBU determines that the user end device UE4 may not be in the communication range of the remote radio head RRH13 and defines the region in the first estimated region R1 and out of the communication range of the remote radio head RRH13 as the second estimated region R2, as the shading area in FIG. 3C. The rest region in the first estimated region R1 is defined as the third estimated region R3, as the shading area shown in FIG. 3D.

In one embodiment, the N estimated coordinates C1~CN are set in the first estimated region R1. For example, N is six. For example, four estimated coordinates C1~C4 are randomly set in the second estimated region R2 and two estimated coordinates C5 and C6 are randomly set in the third estimated region R3. In one condition, after the third message MSG3 is received, the baseband unit BBU firstly reply a message indicating successful registry to the fourth user end device UE4. It's 100 ms after the third message MSG3 is received, so the baseband unit BBU sets a maximum displacement in unit time. For example, a user may drives on highway at 70 mph, which is 34 yard-per-second, so 34 yard-per-second is taken as a maximum displacement in unit time. Because the time difference is 100 ms, the baseband unit BBU calculates a maximum displacement as 3.4 yards based on the time difference and the maximum displacement in unit time.

Figure 4:
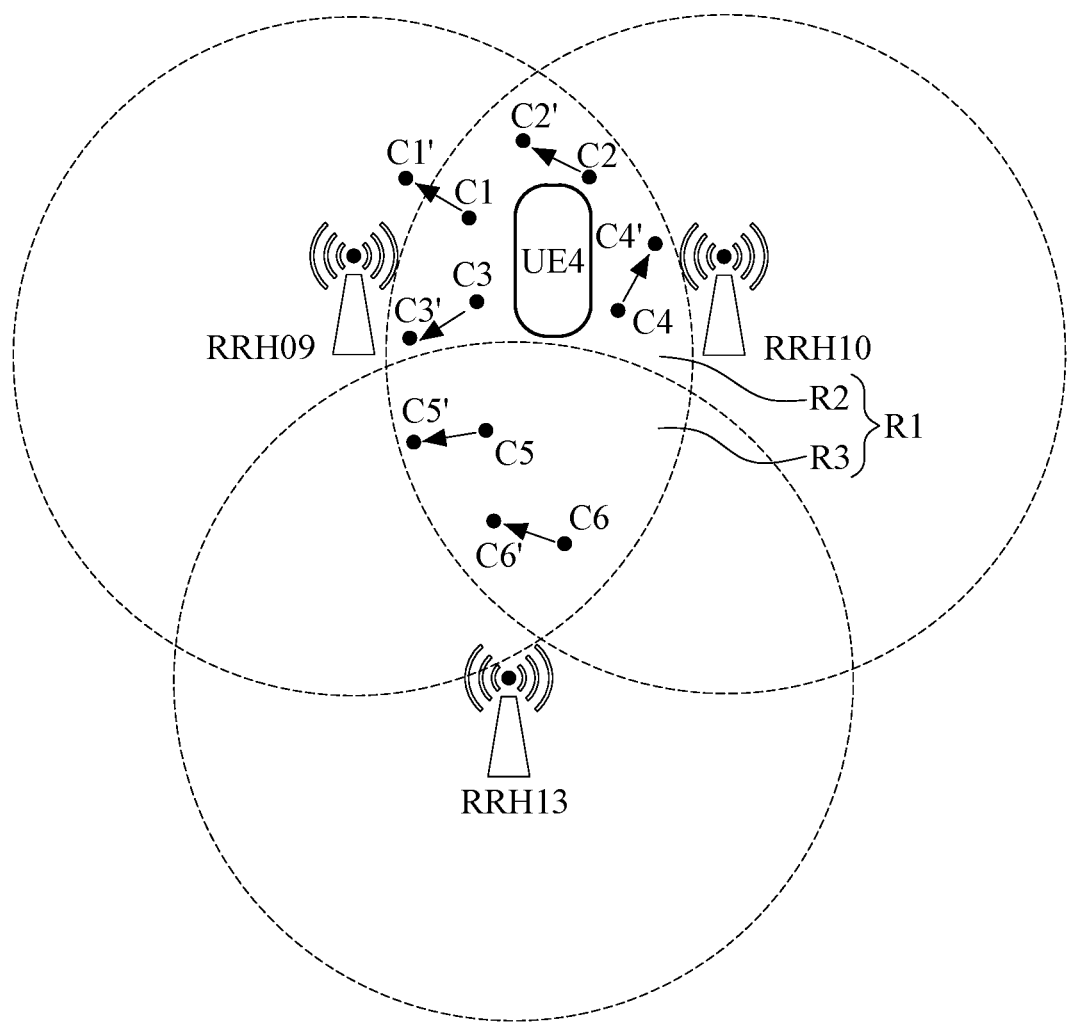
FIG. 4 illustrates a relationship between the modified estimates coordinates and the estimated coordinates in one embodiment of the disclosure.

The baseband unit BBU randomly set the moving directions for the six estimated coordinates C1~C6 respectively, and generates a modified estimated coordinate for each of the six estimated coordinates C1~C6 based on the moving direction and the maximum displacement so as to generate the modified estimated coordinates C1'~C6', as shown in FIG. 4. The way to randomly set the moving direction is, for example, totally randomly with displacement no larger than the maximum displacement, or with the mobility model in the field of wireless network, and the disclosure does not limit thereto.

The estimated coordinates C1'~C6' are all in the communication range of the remote radio head RRH09, so the baseband unit BBU, in one embodiment, sends the message indicating the successful registry, a type-3 downlink packet, to the fourth user end device UE4 only via the remote radio head RRH09.

If the region where the estimated coordinates C1'~C6' are distributed in the physical space is totally covered by the remote radio head RRH09 and the remote radio head RRH13, the baseband unit BBU sends the message indicating the successful registry, a type-3 downlink packet, to the fourth user end device UE4 via the remote radio head RRH09 and the remote radio head RRH13.

In one embodiment, after the baseband unit BBU receives the third message MSG3, the baseband unit BBU waits for the uplink packet from the fourth user end device UE4, a second uplink signal. Hence, the baseband unit BBU obtains the estimated coordinates C1'~C6' by the aforementioned method in 100 ms after receiving the third message MSG3. Then, the baseband unit BBU determines the least remote radio head covering all estimated coordinates C1'~C6' is the remote radio head RRH09, so the minimum covering set is defined to include the remote radio head RRH09. Hence, the baseband unit BBU controls the remote radio head RRH09 to receive the uplink packet from the fourth user end device UE4.

In one embodiment, the baseband unit BBU determines that a set covering the estimated coordinates C1'~C6' with the most remote radio heads includes the remote radio head RRH09, the remote radio head RRH10, and the remote radio head RRH13. The remote radio head RRH09 is used for receiving the packet from the fourth user end device UE4, so the baseband unit BBU controls the remote radio head RRH10 and the remote radio head RRH13 to monitor the uplink signal from the fourth user end device UE4 other than the uplink packet. Hence, even if the fourth user end device UE4 actually moves to the location out of the communication range of the remote radio head RRH09, the uplink signal from the fourth user end device UE4 is still obtained by one or more remote radio heads.

In other words, the baseband unit BBU determines a covering set based on the N, which is six in the aforementioned embodiment, estimated coordinates. The covering set includes at least one second remote radio head among the remote radio heads RRH01~RRH20. The baseband unit BBU controls the second remote radio head to receive the uplink packets or monitor the second uplink signal from the user end device, which is the fourth user end device UE4 in the aforementioned embodiment.

The covering set includes a minimum covering set and a maximum covering set. The minimum covering set is the set of the least remote radio head(s) whose communication range covering the N modified estimated coordinates. In the aforementioned embodiment, the minimum covering set includes the remote radio head RRH09 only. The maximum covering set is the set of all remote radio head capable of communicating with any one of the N modified estimated coordinates. In the aforementioned embodiment, the maximum covering set includes remote radio heads RRH09, RRH10, and RRH13.

The baseband unit BBU is capable of re-calculating and updating the first estimated region R1, the second estimated region R2 and the third estimated region R3 based on the communication range of the one or more remote radio heads obtaining the uplink signal. Further, the amount of the estimated coordinates in the first estimated region is to be kept as six. In one embodiment, if the amount of the estimated coordinates in the second estimated region R2 is less than four, some estimated coordinates are added in the second estimated region R2 so that the amount of the estimated coordinates is kept as four. Further, all estimated coordinates out of the first estimated region R1 are removed.

If the amount of the estimated coordinates in the third estimated region R3 is more than two, part of the estimated coordinates in the third estimated region R3 is randomly removed to keep the amount of the estimated coordinates being two. On the contrary, if the amount of the estimated coordinates in the third estimated region R3 is less than two, at least one estimated coordinate is generated randomly so that the amount of the estimated coordinates in the third estimated region is kept being two.

Figure 5:
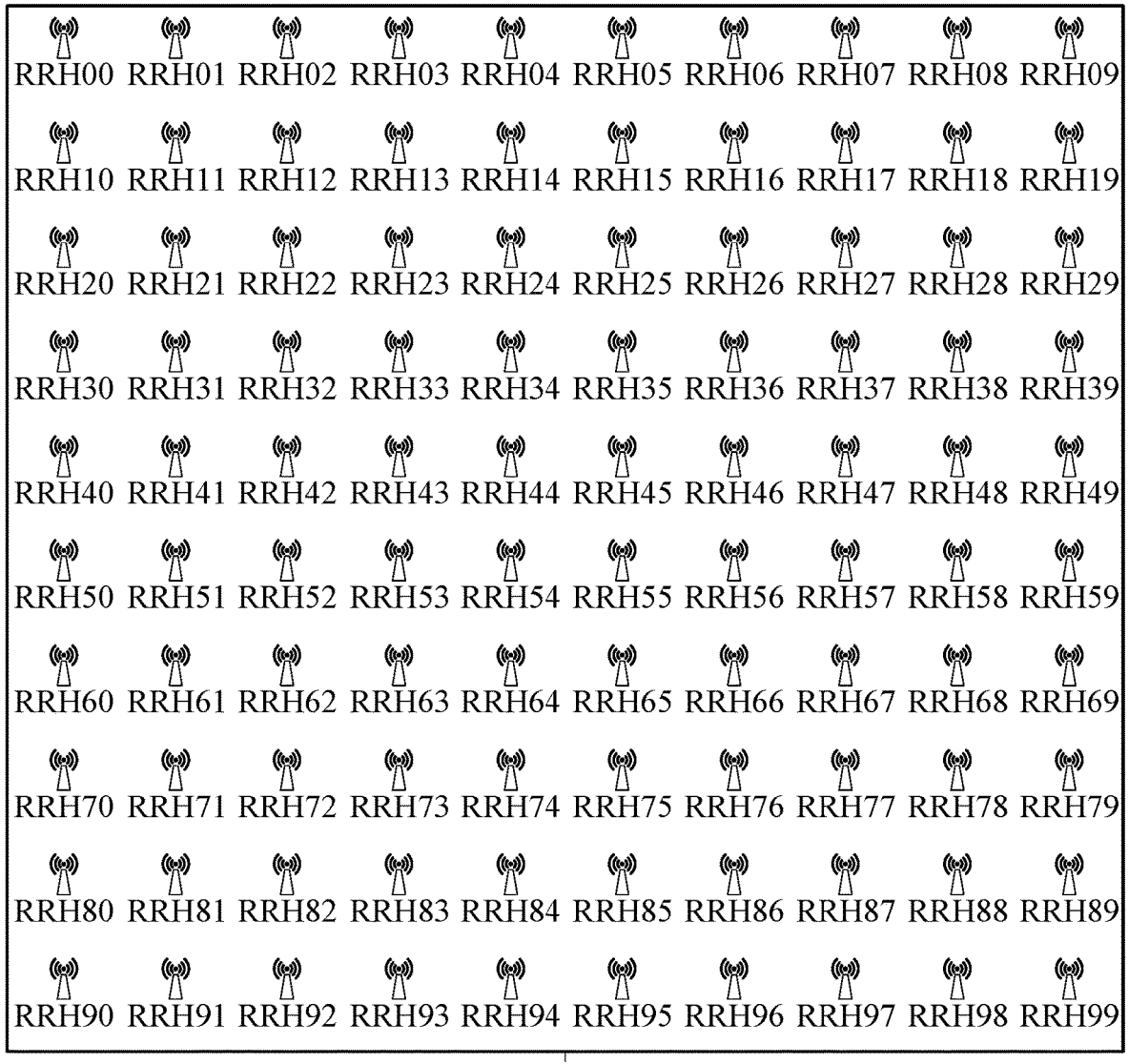
FIG. 5 is a C-RAN arrangement in one embodiment of the disclosure.

In the following paragraphs, a simulation environment is set for illustrating the advantage of the disclosure compared with the conventional technique. Please refer to FIG. 5, which is a C-RAN arrangement in one embodiment of the disclosure. As shown in FIG. 5, one hundred remote radio heads RRH00~RRH99 are distributed evenly in a 250 m*250 m square. All remote radio heads are communicatively connected to the baseband unit BBU. Each of the remote radio head has a communication range with 50 m diameter, and two adjacent remote radio heads are away from each other with 25 m distance. The network traffic mentioned below is the total bits between the baseband unit BBU and the remote radio heads.

As to the type-2 downlink packet, in the conventional technique, each remote radio head occupies four resource blocks in PDCCH, so four remote radio heads occupy one PDCCH, and one hundred remote radio heads totally occupy 25 PDCCH's. According to the aforementioned embodiment of the disclosure, one RAR packet is shared by many adjacent remote radio head, so the amount of the PDCCH occupied is reduced. According to the simulation result, the type-2 downlink packets in the conventional technique occupy about 75 megabits (Mbits) traffic while the type-2 downlink packets in the technique of the disclosure occupy about 15 Mbits.

As to the type-3 downlink packet, in the conventional technique of the handover free C-RAN and all RRH are belong to the same cell, the location of the user end devices do not be determined, so the baseband unit BBU sends the data, to be sent to the user end device, to all one hundred remote radio heads. According to the embodiment in the disclosure, if the maximum displacement is 12.4 m, the packet for the user end device has to be multicasted to the adjacent five remote ratio heads because of the estimation of the estimated coordinates. In other words, the traffic is reduced as one-twentieth of the traffic in the conventional technique.

As to the type-4 downlink packet, in the conventional technique of the handover free C-RAN, the location of the user end devices don't be determined, so no matter how many user end device is in this field, the baseband unit BBU sends the wakening packet to all one hundred remote radio heads. On the contrary, in one embodiment of the disclosure, the wakening packet to wake up one user end device is sent to the remote radio heads receiving the uplink signal of the user end device. Taking the aforementioned simulation environment for example, five adjacent remote radio heads at most need to receive the wakening packet. Hence, if there are N user end devices need to be wakened up, there are at most 5 N remote radio heads need to receive the wakening packets. In other words, in such environment, the technique in one embodiment of the disclosure is better than the conventional technique if the user end device to be wakened up is less than twenty.

Figure 6:
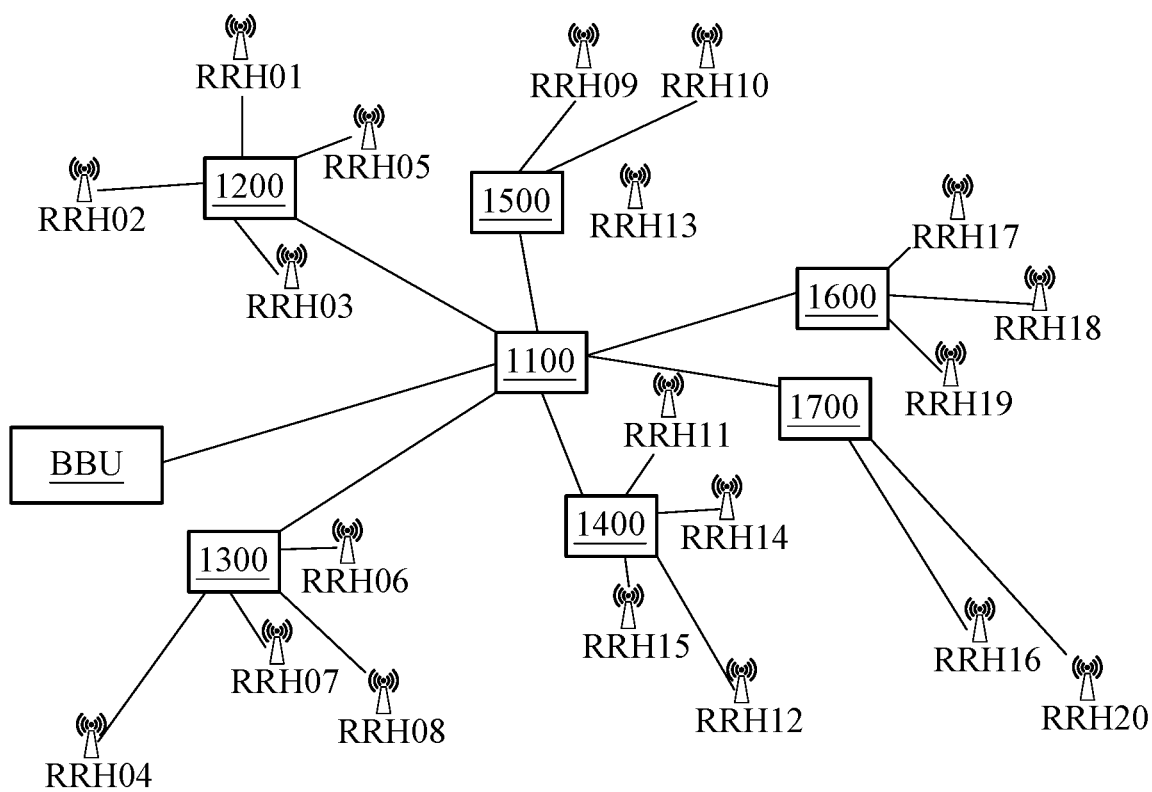
FIG. 6 is a schematic of C-RAN in another embodiment of the disclosure.

In one embodiment, please refer to FIG. 6, which is a schematic of C-RAN in another embodiment of the disclosure. Compared with the structure in FIG. 1, the C-RAN 1000' further includes a plurality of routers 1100~1700. The router 1100 is directly communicatively connected to the baseband unit BBU. The routers 1200~1700 are all communicatively connected to the baseband unit BBU via the router 1100. The router 1200 is also communicatively connected to the remote radio head RRH01, the remote radio head RRH02, the remote radio head RRH03 and the remote radio head RRH05. The router 1300 is also communicatively connected to the remote radio head RRH04, the remote radio head RRH06, the remote radio head RRH07 and the remote radio head RRH08. The router 1400 is also communicatively connected to the remote radio head RRH11, the remote radio head RRH12, the remote radio head RRH14 and the remote radio head RRH15. The router 1500 is also communicatively connected to the remote radio head RRH09, the remote radio head RRH10 and the remote radio head RRH13. The router 1600 is also communicatively connected to the remote radio head RRH17, the remote radio head RRH18 and the remote radio head RRH19. The router 1700 is also communicatively connected to the remote radio head RRH16 and the remote radio head RRH20. In this embodiment, all of the remote radio heads is grouped with grouping algorithm such as k-means algorithm based on the real geometric locations of the remote radio heads. In each group, a router is used to implement the communicative connection between the remote radio heads in the group and the baseband unit BBU.

Figure 7:
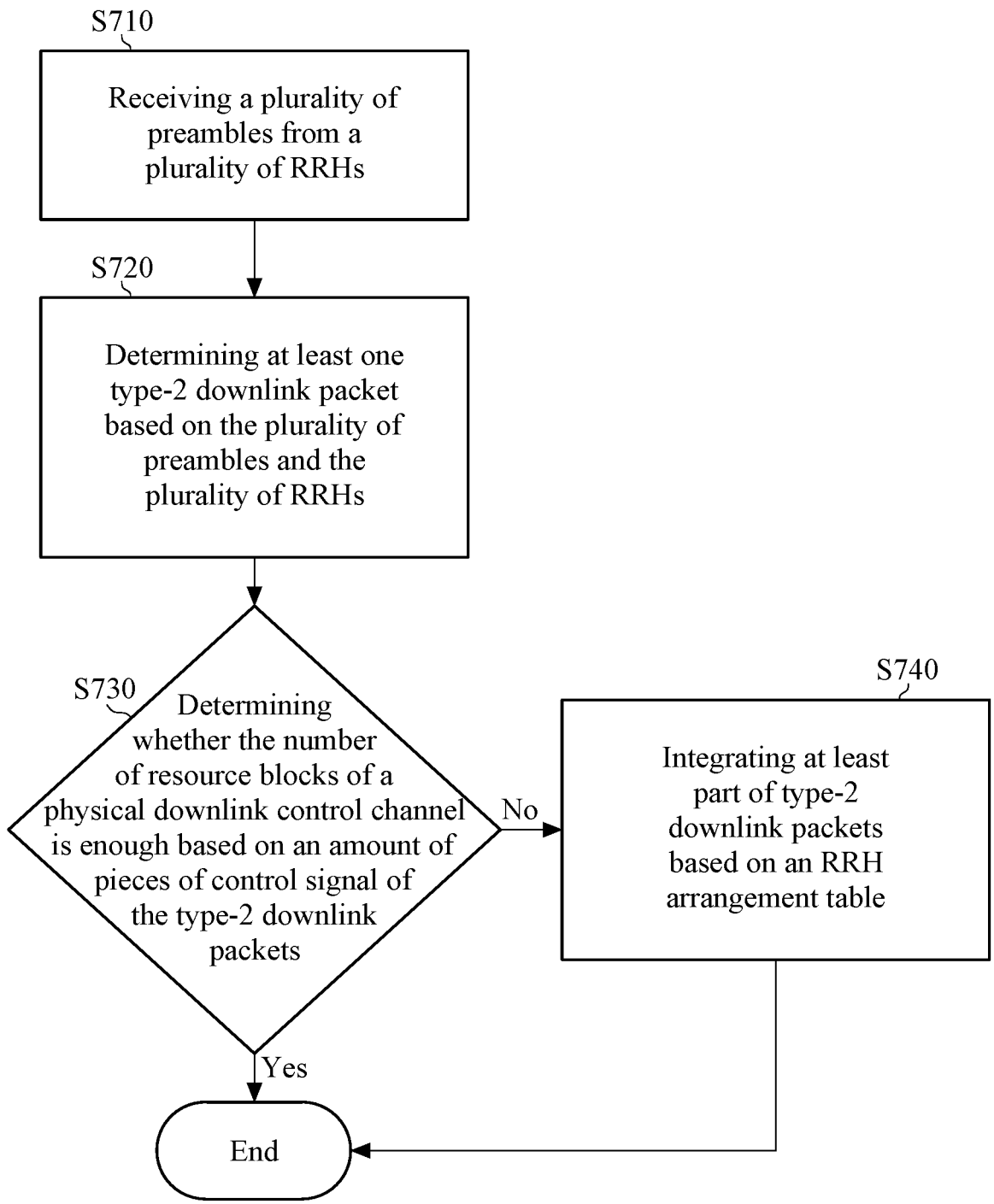
FIG. 7 is a flowchart of the method for controlling C-RAN in one embodiment of the disclosure.

Hence, please refer to FIG. 1, FIG. 2 and FIG. 7, wherein FIG. 7 is a flowchart of the method for controlling C-RAN in one embodiment of the disclosure. As shown in step S710, the baseband unit BBU receives a plurality of preambles PRE from a plurality of remote radio heads RRH01~RRH20, wherein each preamble PRE is corresponding to one user end device UE. As shown in step S720, at least one type-2 downlink packet RAR is determined based on the plurality of preambles PRE and the plurality of remote radio heads. If there are a plurality of type-2 downlink packets RAR, as shown in step S730, whether the number of the resource blocks is enough is determined based on the amount of the control signals of the plurality of type-2 downlink packets. If the number of the resource blocks is not enough, as shown in step S740, at least part of the type-2 downlink packets are integrated into one packet based on the remote radio head arrangement table. The remote radio head arrangement table is used for illustrating a relationship of geometric locations of the remote radio heads RRH01~RRH20.

Figure 8:
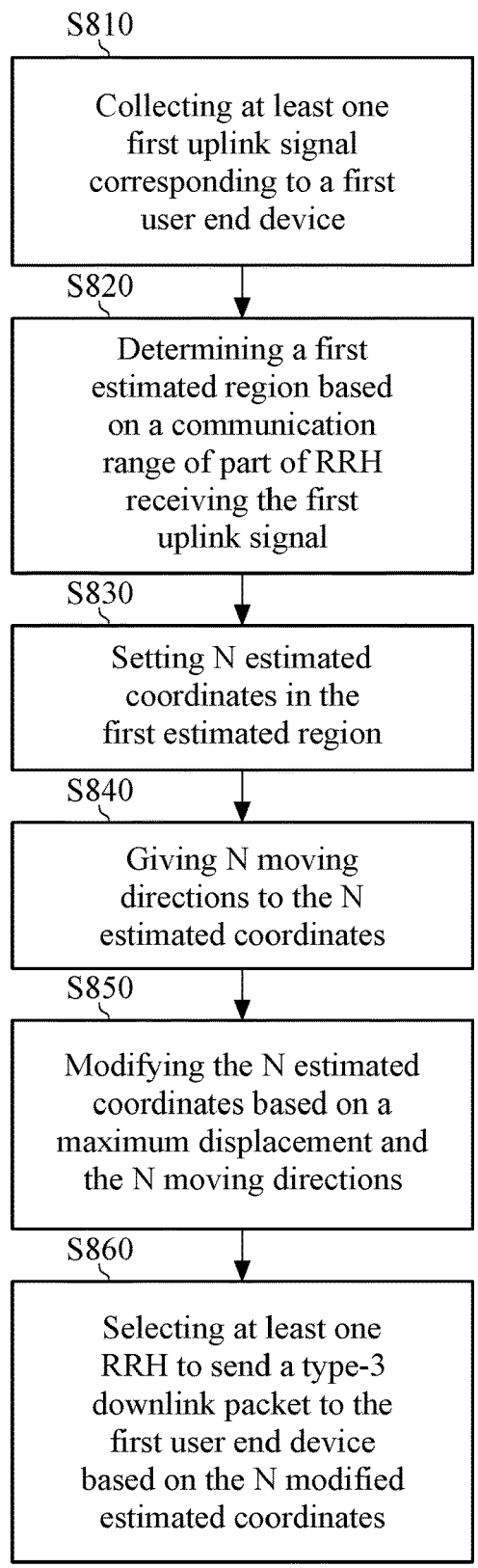
FIG. 8 is a flowchart of the method for controlling C-RAN in another embodiment of the disclosure.

Please refer to FIG. 1, FIG. 2 and FIG. 8, wherein FIG. 8 is a flowchart of the method for controlling C-RAN in another embodiment of the disclosure. As shown in step S810, at least one first uplink signal corresponding to a first user end device is collected. As shown in step S820, a first estimated region is determined based on a communication range of part of remote radio heads (RRHs) receiving the first uplink signal. As shown in step S830, N estimated coordinates are set in the first estimated region, wherein N is larger than one. As shown in step S840, N moving directions are given to the N estimated coordinates. As shown in step S850, the N estimated coordinates are modified based on a maximum displacement and the N moving directions. As shown in step S860, at least one remote radio head is selected for sending the type-3 downlink packet to the first user end device based on the N modified estimated coordinates.

As above, in the method for controlling C-RAN in one embodiment of the disclosure, the physical location of the user end device is estimated based on the information corresponding to the remote radio head(s) receiving the signal so that the accuracy of the packet transmission is improved and packet traffic between the baseband unit and the remote radio head, the front haul traffic, is reduced.

What is claimed is:

1. A method for controlling C-RAN, applicable for a C-RAN having a plurality of remote radio heads and a baseband unit, wherein the method comprises:
    receiving a plurality of preambles from the plurality of remote radio heads wherein each of the preambles is corresponding to one user end device;
    determining at least one type-2 downlink packet based on the plurality of preambles and the plurality of remote radio heads;
    if the number of the at least one type-2 downlink packet is plural, determining whether a number of resource blocks of a physical downlink control channel is enough or not based on an amount of control signals of the plurality of type-2 downlink packets; and
    if the number of resource blocks is not enough, integrating at least part of the plurality of type-2 downlink packets based on a remote radio head arrangement table; and
    wherein the remote radio head arrangement table is used for describing a relationship between geometric locations of the plurality of remote radio heads, and the method further comprises controlling part of the plurality of remote radio heads receiving the plurality of preambles to receive a third message.

2. A method for controlling C-RAN having a plurality of remote radio heads and a baseband unit, comprising:
    collecting at least one first uplink signal corresponding to a first user end device;
    determining a first estimated region based on a communication range of part of the plurality of remote radio heads receiving the at least one first uplink signal;
    setting N estimated coordinates in the first estimated region, wherein N is an integer larger than one;
    setting N moving directions for the N estimated coordinates respectively, wherein the N moving directions are different;
    modifying the N estimated coordinates based on a maximum displacement and the N moving directions; and
    selecting at least one remote radio head among the plurality of remote radio heads based on the N modified estimated coordinates to send a type-3 downlink packet to the first user end device.

3. The method in claim 2, further comprising determining a second estimated region and a third estimated region based on the communication range of part of the plurality of remote radio heads receiving the at least one first uplink signal and a communication range of part of the plurality of remote radio heads not receiving the at least one first uplink signal, wherein the second estimated region and the third estimated region are mutually exclusive and the first estimated region consists of the second estimated region and the third estimated region.

4. The method in claim 2, further comprising:
    determining a covering set based on the N modified estimated coordinates, wherein the covering set includes at least one second remote radio head among the plurality of remote radio heads; and
    receiving an uplink packet of the first user end device or monitoring a second uplink signal of the first user end device by the at least one second remote radio head.

5. The method in claim 4, wherein the covering set includes a minimum covering set and a maximum covering set, and the minimum covering set is a set comprising the least of the plurality of remote radio heads to cover the N modified estimated coordinates, and the maximum covering set is a set comprising all remote radio heads capable of communicating with at least one among the N modified estimated coordinates.

6. The method in claim 5, further comprising using the at least one second remote radio head corresponding to the minimum covering set to receive the uplink packet.

7. The method in claim 4, further comprising:
    updating the first estimated region based on a communication range of part of the plurality of remote radio heads receiving the second uplink signal;
    selectively removing part of the N modified estimated coordinates based on the updated first estimated region; and
    adding at least one estimated coordinate so as to keep an amount of the modified estimated coordinates as N.

8. The method in claim 2, further comprising:
    receiving a plurality of preambles from the plurality of remote radio heads wherein each of the preambles is corresponding to one user end device;
    determining at least one type-2 downlink packet based on the plurality of preambles and the plurality of remote radio heads;
    if the number of the at least one type-2 downlink packet is plural, determining whether a number of resource blocks of a physical downlink control channel is enough or not based on an amount of control signals of the plurality of type-2 downlink packets; and
    if the number of resource blocks is not enough, integrating at least part of the plurality of type-2 downlink packets based on a remote radio head arrangement table;
    wherein the remote radio head arrangement table is used for describing a relationship between geometric locations of the plurality of remote radio heads.

9. The method in claim 8, further comprising controlling part of the plurality of remote radio heads receiving the plurality of preambles to receive a third message.

* * * * *